United States Patent

Fiorino et al.

Patent Number: 5,521,029
Date of Patent: May 28, 1996

[54] CURRENT COLLECTING ELEMENTS

[75] Inventors: Mary E. Fiorino, Bridgewater; Jorge L. Valdes, Bedminster, both of N.J.

[73] Assignee: AT&T Corp., Murray Hill, N.J.

[21] Appl. No.: 392,441

[22] Filed: Feb. 22, 1995

[51] Int. Cl.$^6$ .............................. H01M 4/68; H01M 4/73
[52] U.S. Cl. .................... 205/150; 429/233; 429/225; 429/245; 204/490; 205/183; 205/299
[58] Field of Search ................... 429/233, 245, 429/225; 204/181.5; 427/126.3

[56] References Cited

U.S. PATENT DOCUMENTS

| | | | |
|---|---|---|---|
| 3,647,661 | 3/1972 | Matsushita | 204/181.1 |
| 4,297,421 | 10/1981 | Turillon et al. | 429/225 |
| 4,324,848 | 4/1982 | Will | 429/245 |
| 4,422,917 | 12/1983 | Hayfield | 204/196 |
| 5,017,446 | 5/1991 | Reichman et al. | 429/223 |
| 5,045,170 | 9/1991 | Bullock et al. | 204/280 |
| 5,126,218 | 6/1992 | Clarke | 429/245 |
| 5,143,806 | 9/1992 | Bullock et al. | 429/228 |

FOREIGN PATENT DOCUMENTS

| | | |
|---|---|---|
| 1443502 | 7/1976 | European Pat. Off. |
| 0047595A1 | 3/1982 | European Pat. Off. |
| 0360942A1 | 4/1990 | European Pat. Off. |
| 0360942B1 | 7/1993 | European Pat. Off. |

OTHER PUBLICATIONS

Graves, J. E. et al. "The Electrochemistry of Magneli Phase Titanium Oxide Ceramic Electrodes", Journal of Appl. Electrochemistry, 21, pp. 848–857, (1991).

Bullock, N. K. et al. "Use of Conductive Materials to Enhance Lead–Acid Battery Formation", Journal Electrochem. Soc., vol. 138, No. 12, Dec., (1991).

Graves, J. E. et al. "The Electochemistry of Magneli Phase Titanium Oxide Ceramic Electrodes, Part II: Ozone Generation at Ebonex and Ebonex/Lead Dioxide Anodes", Journal of Applied Electrochemistry 22, pp. 200–203, (1992).

Primary Examiner—Stephen Kalafut
Assistant Examiner—Carol Chaney
Attorney, Agent, or Firm—Richard J. Botos

[57] ABSTRACT

The present invention is directed to a substrate with a coating of titanium suboxide thereon. The coating protects the substrate from corrosion. Typically, the substrate is a current collector for a lead acid battery. The present invention is also directed to a process for forming the coating of titanium suboxide coating on the substrate. A colloidal dispersion of titanium suboxide particles in water is formed. The pH of the colloidal dispersion is brought within the range of 3 or less. The substrate to be coated is then placed in the colloidal dispersion. A positive electrode is also placed in the colloidal dispersion. An electric field is then introduced into the colloidal dispersion to effect electrophoretic deposition of the titanium suboxide on the substrate.

13 Claims, 2 Drawing Sheets

CURRENT COLLECTING ELEMENTS

BACKGROUND OF THE INVENTION

1. Technical Field

The invention relates to current collectors that are coated with a material that resists corrosion in a lead acid battery environment. The invention also relates to the formation of a corrosion-resistant coating on lead, lead alloy, lead oxide, and other metal surfaces exposed to sulfuric acid environments such as surfaces of lead-acid battery components.

2. Background Art

Lead-acid batteries are the most commonly-used batteries in the world today and represent approximately 60% of all battery sales. Lead-acid batteries find use in such diverse fields as automotive, lighting, power tools, and telephone systems. Lead-acid batteries typically employ two electrodes, a positive lead dioxide electrode and a negative metallic lead electrode. A sulfuric acid solution is used as the electrolyte.

The charge/discharge mechanism of lead-acid batteries is known as the "double-sulfate" reaction. During discharge, both the metallic lead of the negative electrode and the lead dioxide of the positive electrode are converted to lead sulfate. The reverse process occurs during battery charging, namely, lead sulfate is converted to metallic lead at the negative electrode and to lead dioxide at the positive electrode.

Although lead-acid batteries have numerous designs, many batteries employ lead or lead alloys as current collectors for electrodes. As implied by the name, current collectors store current. Typically, these collectors contain a paste-like active material which performs the current collector function. The paste-like active material is used because it lowers the cost of making current collectors. The current collectors may take on a variety of configurations, however, all are designed to mechanically hold the active material. The active material initially takes the form of a paste comprising active lead and lead oxides, water, and sulfuric acid. The paste is mechanically molded into the lead current collector to make a battery plate. The final battery is constructed by interleaving positive and negative battery plates using separators to provide electronic isolation. A more detailed discussion of lead-acid batteries may be found in Linden, Ed., *Handbook of Batteries and Fuel Cells*, (McGraw-Hill Book Company, New York, c. 1984), the disclosure of which is incorporated herein by reference.

A variety of battery components in numerous battery configurations are exposed to a sulfuric acid environment. In particular, lead-containing current collecting elements take the form of grids, lead spines in tubular batteries, Plante-type electrodes, thin film electrodes, made using lead sheets, or bipolar electrodes that employ lead-containing surfaces which contact sulfuric acid.

Lead-acid batteries are extremely reliable and can be constructed to have long service lives. However, due to the nature of the battery environment, particularly the potentials generated at the positive plate, one of the main battery failure modes is corrosion. During corrosion, the lead current collector reacts with the acidic electrolyte and is converted into lead oxides. These reaction products are less dense than lead in the elemental form. As more reaction products form, the resultant stress in the oxide layers extrudes the current collector, a process termed "grid creep" when applied to grid extrusion. Grid creep is an irreversible mechanical distortion of a current collector such as a battery grid, resulting in separation of the active material and/or physical distortion of the entire battery. In severe cases of grid creep, the battery housing may crack as the current collector is forced against the walls of the battery. To avoid this problem, battery designers must include extra space in the battery housing to accommodate future expansion due to grid creep.

Numerous solutions have been proposed to alleviate the problem of grid creep in lead-acid batteries. One technique involves alloying the lead current collectors with various elements to increase their rigidity, and hence their resistance to grid creep. However, these alloying elements, which typically add strength through formation of a second phase, e.g. precipitates and eutectics, within a lead matrix, increase the susceptibility of the material to corrosion. The design of the current collector itself can also enhance battery life by providing a configuration that promotes uniform mechanical expansion during corrosion. Increasing the thickness of the battery current collectors also increases their resistance to mechanical distortion.

However, these prior approaches to current collector design merely minimize the effects of grid creep. They do not deal with the fundamental problem of current collector corrosion. In U.S. Pat. No. 5,143,806 to Bullock et al., the disclosure of which is incorporated herein by reference, the problem of lead-acid battery grid corrosion is addressed through the formation of a protective layer of barium metaplumbate, $BaPbO_3$, on the lead battery grid. Barium metaplumbate is a conductive oxide having the perovskite crystal structure. Although barium metaplumbate resists attack by sulfuric acid, barium metaplumbate does decompose over time to form $BaSO_4$ and $PbO_2$ in the presence of sulfuric acid.

Another solution to the problem of collector corrosion is proposed in U.S. Pat. No. 5,126,218 to Clarke (the "Clarke '218 patent"), the teachings of which are incorporated by reference. Clarke proposes making the entire collector of a conductive ceramic material, sub-stoichiometric titanium oxide ($TiO_x$, where x= 1.55 to 1.95). Although such collectors do not corrode or degrade in sulfuric acid, they are difficult to fabricate and use because of the brittle nature of the ceramic material.

Therefore, there is a need for corrosion resistant collectors for lead-acid batteries that avoid the previously described problems.

SUMMARY OF THE INVENTION

The present invention provides for substrates coated with an anti-corrosion layer containing sub-stochiometric titanium oxide (titanium suboxide). Titanium suboxides have the general formula $Ti_xO_y$, wherein the ratio of y to x is less than 2. Examples of titanium suboxides include the Magneli phase titanium oxides, examples of which are $Ti_4O_7$, $Ti_5O_9$, $Ti_6O_{11}$, $Ti_7O_{13}$, $Ti_8O_{15}$ and $Ti_9O_7$. The substrates are typically lead-containing, lead alloy-containing, and lead oxide-containing substrates. However, substrates made of other electron-conducting materials that are not as dense as lead are also contemplated. Examples of these alternative substrate materials include aluminum, molybdenum, nickel, titanium, tungsten and zirconium. The coated substrates are typically corrosion-resistant current collectors which are assembled as part of the positive plate in a lead-acid battery. The coated collectors have advantages over the sub-stoichiometric titanium collectors described in the Clarke '218 patent because the coated collectors are cheaper and easier to fabricate and are also less brittle than the collectors described in the '218 patent. It is advantageous if the titanium suboxide-coated substrates are overcoated with a layer of lead.

The present invention also provides a process for forming the titanium suboxide-containing coating on the substrate. These substrates are typically current collectors for lead acid batteries. In the present process colloidal particles of titanium suboxide are dispersed in an acidic, aqueous solution. The substrate is then placed in the colloidal dispersion and an electric field is applied to the colloidal dispersion with the substrate therein to electrophoretically deposit a coating of titanium suboxide on the substrate. The voltage applied to the colloidal dispersion and the time for which this voltage is applied are selected so that substantially all of the substrate is covered by the titanium suboxide coating. The voltage and time selected for the electrophoretic deposition is largely a matter of design choice. One skilled in the art is familiar with the times and voltages needed to form a substantially uniform coating on a substrate using an electrophoretic deposition process. After the coating of titanium suboxide is formed on the substrate, it is advantageous if a coating of lead is electrochemically formed thereover.

DETAILED DESCRIPTION

Figure 1:
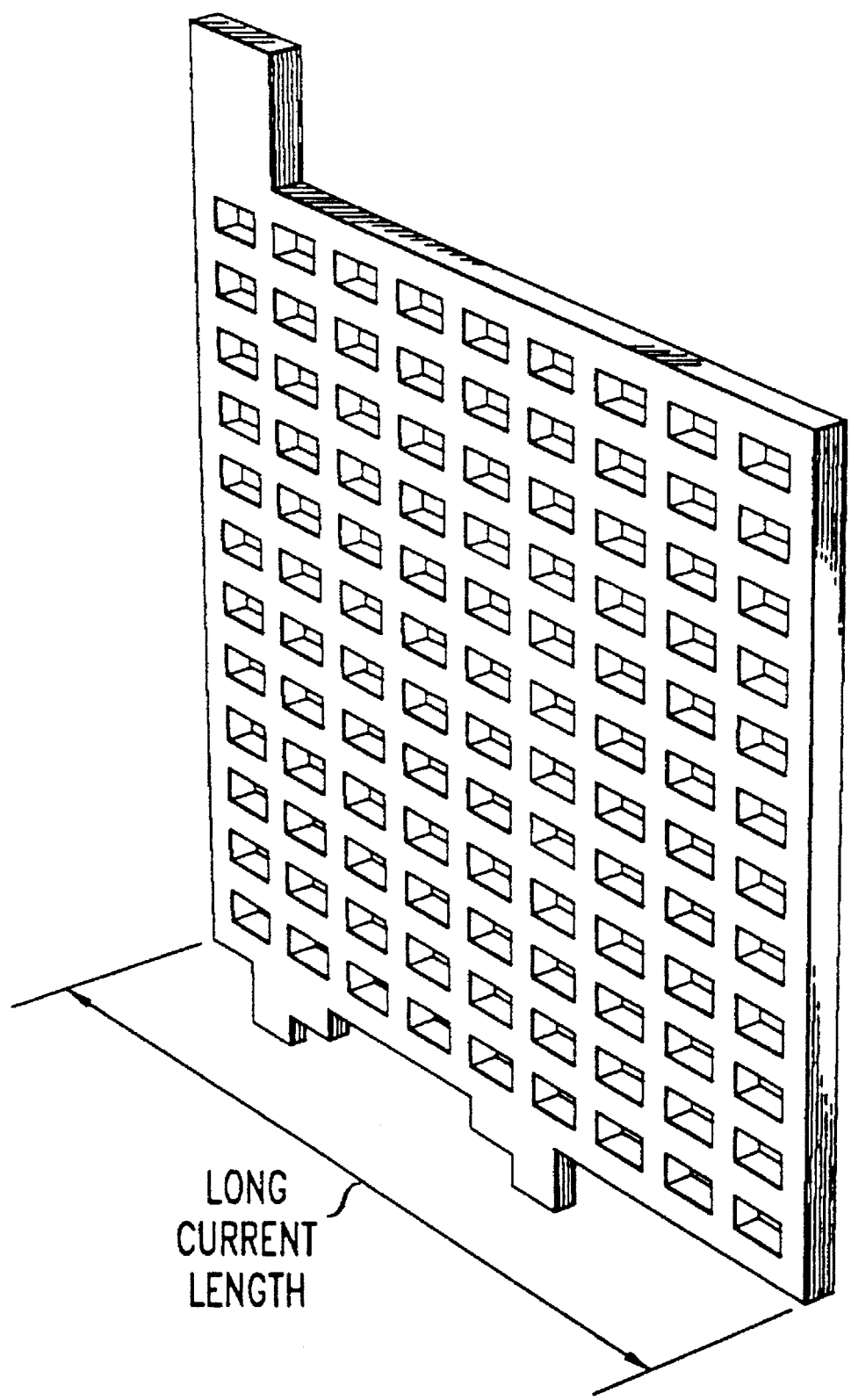
FIG. 1 is a perspective view of a lead grid of a conventional lead acid battery.

According to the invention, a substrate is coated with an anti-corrosion layer containing titanium suboxide. The substrates include lead-containing battery components such as current collectors. The substrates also include battery components such as straps and lugs. A conventional lead grid configuration for a lead acid battery is illustrated in FIG. 1. One skilled in the art will recognize that current collectors come in a variety of configurations, including lead spines in tubular batteries, Plant-type electrodes, thin-film electrodes that are made using lead sheets, and bipolar electrodes. In lead acid batteries, these collectors are made of lead or lead alloys. However, according to the present invention, other substrate materials are also contemplated. It is advantageous if these substrate materials have a density less than that of lead. It is also advantageous if these substrate materials have an electrical conductivity that is at least about that of lead.

The corrosion-resistant coating is applied such that substantially the entire surface of the collector is covered by the coating. The coated collector of the present invention is used in the same manner as conventional collectors used in lead acid batteries. Because the coating protects the collector from corroding in the sulfuric acid environment, the coated collector is less susceptible to the creep that is associated with such corrosion. In the prior art, the structure of the collector was made more substantial to retain its mechanical strength and to resist grid creep that results from such corrosion. Since the coated collectors of the present invention are less susceptible to such corrosion, the structure of the collector does not have to be reinforced to resist grid creep or other premature mechanical failure caused by corrosion. Consequently, since the coated structures of the present invention do not have to be reinforced to ensure that the collector retains its structural integrity after being partially corroded by the sulfuric acid in the lead acid battery environment, they are made of less material. Thus the coating of the present invention enables batteries to be lighter and less expensive because the collectors and other structures over which the coating is formed are made of less material.

One skilled in the art will appreciate that it is difficult to coat substantially the entire surface of a substrate such as the one depicted in FIG. 1. The collectors of the present invention are made by the electrophoretic deposition of titanium suboxide particles on the collector to achieve the desired degree of coating on such substrates. The titanium suboxide coating is formed on the collectors by first forming a colloidal mixture of titanium suboxide particles in pure distilled and deionized water. Titanium suboxide particles, e.g. $Ti_4O_7$, $Ti_5O_9$, $T_6O_{11}$, etc. and mixtures thereof, are mixed with water, or another appropriate polar liquid with a high dielectric constant that is at least about that of water, to form the colloidal mixture.

It is advantageous if the average particle size of the titanium suboxide in the colloidal mixture is less than about 4 μm, and preferably less than about 2 μm. The desired size of the titanium suboxide particles is obtained using conventional grinding techniques such as milling. An example of a suitable milling technique is one in which the titanium suboxide particles are combined with water and zirconium oxide pellets with a nominal diameter of about 1 cm. The mixture is then placed in a milling machine until the desired particle size is obtained.

In an electrophoretic deposition technique, the substrate is placed in the colloidal mixture and a voltage is applied to the mixture. The charged particles to be deposited migrate toward the electrode with the opposing charge. In one embodiment of the present invention, the positively charged particles migrate toward the negative electrode. The negative electrode is the collector on which the coating of suboxide particles is formed. Therefore, the colloidal dispersion must provide conditions under which the titanium suboxide particles will migrate toward the collector when a voltage is applied thereto.

If the titanium suboxide particles are positively charged, then the particles will migrate toward the collector during electrophoretic deposition. One way to obtain a positive surface charge on the titanium suboxide particles in the aqueous colloidal dispersion is to lower the pH of the colloidal dispersion. The pH of the dispersion is lowered by adding a strong acid such as HCl or an organic acid with a $pK_a$ of less than about 6, such as acetic acid.

Figure 2:
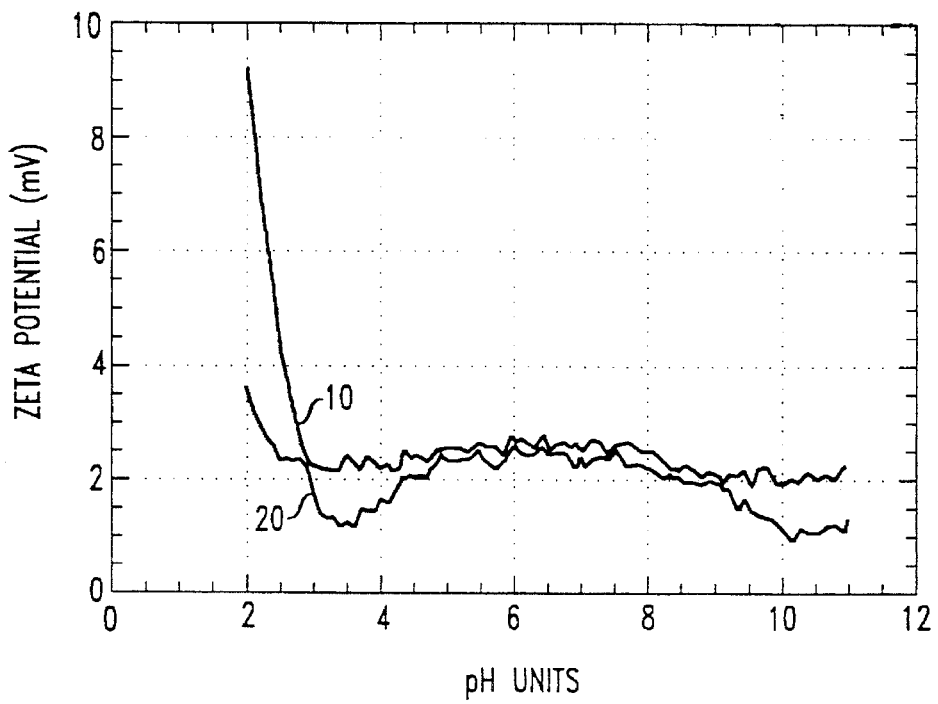
FIG. 2 is a graph of the relationship between the pH of the colloidal dispersion and the zeta potential of particles in that dispersion.

The pH that will provide the desired environment to facilitate the migration of the particles toward the negative electrode is a function of the acid used to lower the pH. As illustrated in FIG. 2, the charge on the particles (zeta potential) at a particular pH is a function of the acid environment because the particles had much higher zeta potentials at a pH of 2 in HCl than in acetic acid.

Although applicants do not wish to be held to a particular theory, it is believed that the deposition flux, $F_{ed}$, during electrophoretic deposition is related to the surface charge of the titanium suboxide particles. The relationship is reflected by the following equation:

$$F_{ed} = C_p \mu_e \hat{E} \qquad (1)$$

where $C_p$ is the concentration of particles $\mu_e$ is the electrophoretic mobility and $\hat{E}$ is the applied electric field. The electrophoretic mobility of the titanium suboxide particles is given by the following equation:

$$\mu_e = 2\epsilon\zeta/3\eta \qquad (2)$$

where $\epsilon$ is the dielectric constant of the medium, $\zeta$ is the zeta potential or surface charge of the particle and $\eta$ is the Newtonian viscosity of the dispersion. Thus, deposition flux is related to the zeta potential of the particles in solution.

The zeta potential of the particles in solution is, in turn, related to the pH of the solution. The relationship between the zeta potential and the pH of the colloidal dispersion is illustrated in FIG. 2. From FIG. 2, it is determined that electrophoretic deposition of titanium suboxide particles on a negative electrode in an HCl 10 or an acetic acid 20 environment occurs when the pH of the colloidal dispersion is about 3 or less. The HCl environment is designated 10 in FIG. 2 and the acetic acid environment is designated 10 in FIG. 2. It is advantageous if the pH of the aqueous dispersion is less than about 2. However, the relationship between zeta potential and pH depends somewhat upon the acid environment. Therefore, one must measure the zeta potential of the particles in a particular acid environment to determine the desired pH range for electrophoretic deposition. Typically the pH range that provides particles with a zeta potential of at least about 2.5 mV is advantageous.

It is advantageous if the colloidal dispersion is aged after the pH of the colloidal dispersion is brought within the desired range. Although the effects of aging will vary depending upon the specific pH of the dispersion, it is believed that aging the dispersion from 1 to 3 hours will significantly increase the surface charge of the titanium suboxide particles in the dispersion. For example, in a colloidal dispersion of titanium suboxide particles (1% by volume titanium suboxide particles in water) with an average particle size of about 1.9 µm in which the pH is adjusted to 2 by adding HCl (from a 1M stock solution), the surface charge of the titanium suboxide particles, measured using a conventional device for measuring the electrokinetic sonic amplitude (such as an ESA Model-8000 obtained from Matec Applied Sciences of Hopkinton, Mass.) was about +6 millivolts at time zero. After about 3 hours, the surface charge of the particles was measured at +12 millivolts.

Figure 3:
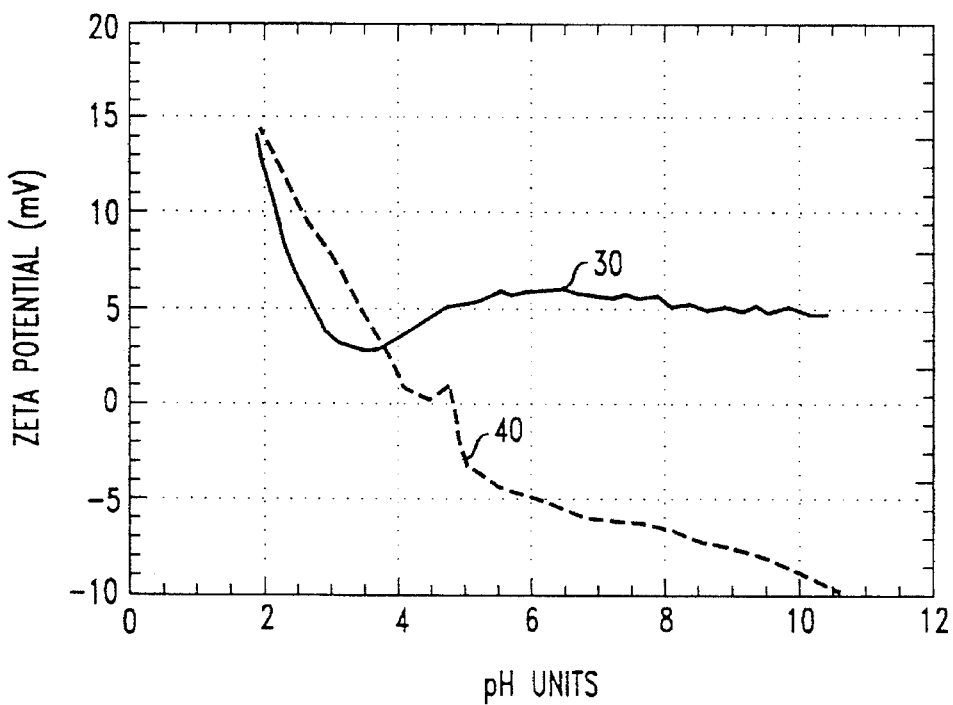
FIG. 3 illustrates the effect of milling on the relationship between the pH and the zeta potential of particles in the dispersion.

FIG. 3 illustrates the effect of milling on the zeta potential of particles at a particular pH. FIG. 3 illustrates that the effect is small at pHs less than 4. At pHs greater than 4, however, the zeta potential of the unmilled particles 30 is higher than the zeta potential of the milled particles 40. FIG. 3 illustrates that the zeta potential of the milled particles goes from positive to negative (known as the isoelectric point) at a pH of about 5. Particles with a negative zeta potential will not deposit on a negative cathode. Consequently, the milled particles will deposit on a positive anode at pHs above 5 and on a negative cathode at pHs below 5. The unmilled particles never reach their isoelectric point at any pH. Consequently, the unmilled particles will not deposit on a positive anode.

After the pH of the colloidal dispersion is brought within the desired range, it is advantageous if the colloidal dispersion is ultrasonicated to produce a more uniform dispersion. Any conventional ultrasonication technique is used for this purpose. One skilled in the art is familiar with these techniques.

The colloidal dispersion, prepared as described above, is then used to effect the deposition of titanium suboxide particles onto a lead-containing collector. The collector is placed in the dispersion such that portions that are to be coated with the particles is submerged. A positive electrode is placed in the dispersion. It is advantageous if the electrode does not form reaction products that interfere with the electrophoretic deposition. Examples of suitable electrodes include platinum and palladium. The selection of the material for the positive electrode depends upon the solution in which the electrophoretic deposition takes place. For example, gold electrodes are suitable if the solution does not contain chloride because the chloride forms a complex with gold, which causes the electrode to decompose.

A fixed voltage is then applied to the colloidal dispersion by applying a fixed voltage between the negative electrode and the positive electrode. The voltage, and the time the voltage is applied, is largely a matter of design choice. Since the objective of the process is to provide a corrosion resistant coating over the collector, it is advantageous if the voltage and the time are selected such that all of the desired portions of the collector are covered with a coating of the titanium suboxide particles. In one example, applying 25 volts to the above-described colloidal dispersion for about 5 minutes resulted in the deposition of an acceptable coating of titanium suboxide particles on a lead substrate.

After electrophoretic deposition, the collector is removed from the colloidal dispersion and dried. It is contemplated that drying will be accomplished at elevated temperature to accelerate the process. For example, the collector can be placed in an oven at 140° C. for about 2 to about 3 minutes. It is advantageous if the collector is then heat treated to promote adhesion of the particles to the collector. One contemplated method to promote adhesion is to heat the collector in an inert atmosphere (to avoid oxidation of the coating) to a temperature of about 200° C. to about 300° C. The coated collector is held at that temperature for a period of time, typically less than 1 hour, to promote adhesion of the particles to the collector surface.

After the collector is coated with titanium suboxide particles as described above, the coated collector is optionally overcoated with a layer of lead. The lead is coated on the collector using conventional electroplating techniques well known to those skilled in the art. Standard electroplating chemistry and conditions for the deposition of lead on conducting metal substrates are contemplated as suitable for this purpose. See Lowenheim, F. A. ed., *Modern Electroplating*, p. 266 et seq., (John Wiley and Sons, pub. 1974).

The following example is illustrative of a method for coating titanium suboxide on a lead-containing substrate. While the example uses a collector grid as the substrate, it is understood that the nature of the invention permits substrates of a variety of shapes to be coated.

EXAMPLE 1

A titanium suboxide powder was obtained from Atraverda, Ltd. of the United Kingdom. The average particle size of the titanium suboxide powder was about 4.5 µm as determined using a conventional light scattering technique. The titanium suboxide powder was milled to reduce its particle size. Titanium suboxide particles (one percent by volume) were mixed with distilled and dionized water. The total volume of the mixture was 500 ml. The mixture was placed in a 1000 ml container. The remaining volume of the container (500 ml) was filled with pure zirconium oxide pellets which had a nominal diameter of amount 1 cm. The mixture was placed in a milling machine for about 3 days. After the milling procedure was completed, the resulting dispersion was analyzed using a Horiba LA-900 light scattering apparatus. The mean particle size was reduced to 1.88 µm.

The zirconium oxide particles were removed from the mixture and the pH of the mixture was adjusted to about 3 by adding a few milliliters of a 1M aqueous stock solution of HCl to the aqueous mixture (500 ml) of titanium suboxide particles. After about 3 hours, the pH of the mixture equilibrated to 2. The surface charge of the particles was measured and found to be about 12 mV.

The mixture was then ultrasonicated for 15 minutes using a Sontrier 250 sonificator obtained from Branson. The Sontrier was operated at 20 percent of full power. A colloidal dispersion of titanium suboxide particles in aqueous solution was obtained.

A lead electrode substrate (a circular disc with a diameter of 0.625 inches) was cleaned by immersing it in a solution of glacial acetic acid and water (1:1 by volume) for about 3 minutes. The lead electrode substrate was then removed from the solution and rinsed for 10 seconds with pure distilled and dionized water. The lead electrode substrate was immediately placed in the container for electrophoretic deposition. The colloidal dispersion of titanium suboxide particles had previously been placed in the container.

A gold disk was also placed in the container for electrophoretic deposition. The gold electrode functioned as the positive electrode (anode). The lead electrode functioned as the negative electrode (cathode). A voltage of 25 volts was applied to the colloidal mixture for about 5 minutes. The coated lead electrode was removed from the container and placed in a convection oven at 140° C. for 2 to 3 minutes for drying.

The coated electrode was then heated to promote adhesion between the electrode and the titanium suboxide coating thereon. The coated electrode was placed in a nitrogen atmosphere. A hot plate was used to heat the electrode. The hot plate temperature was controlled between 100° C. and 300° C. The coated electrode was heated for about 20 minutes under these conditions. The electrode was then cooled to room temperature before further processing.

Lead was then electroplated onto the coated electrode. The coated electrode was placed in an electroplating solution containing lead (60 g/l). The solution was Electropure® lead fluroborate plating solution obtained from the Atochem Corp. of Somerset, N.J. The solution had a fluoroboric acid concentration of 75 g/l. The solution also contained peptone (2 percent by volume) and an excess of boric acid. The electrode was immersed in the bath. A cathodic current of 24 mA/cm$^2$ was applied for 7 to 8 minutes while the bath was stirred. The temperature of the bath was maintained in the range of about 24° C. to about 32° C. A lead coating with a thickness of about 10 μm was formed on the electrode.

We claim:

1. A method for coating a metal substrate with a layer including a titanium sub-oxide comprising:

forming a colloidal dispersion of titanium sub-oxide particles in an aqueous solution with a pH of about 1 to about 3; and placing the metal substrate in the colloidal dispersion; and electrophoretically forming a coating of titanium sub-oxide particles on the metal substrate.

2. The method of claim 1 wherein the metal substrate is selected from the group consisting of lead-containing substrates, aluminum substrates, molybdenum substrates, nickel substrates, titanium substrates, tungsten substrates and zirconium substrates.

3. The method of claim 2 wherein the lead-containing substrate is selected from the group consisting of lead, lead oxide, and lead alloy.

4. The method of claim 1 wherein the coating of titanium sub-oxide particles is electrophoretically formed on the substrate by providing a positive electrode in the colloidal dispersion and applying an electric field for an amount of time sufficient to form a coating of titanium oxide particles over substantially all of the metal substrate surface.

5. The method of claim 4 wherein the average particle size of the titanium sub-oxide particles is less than about 4 μm.

6. A method for forming a battery having a current collector coated with a layer of titanium sub-oxide comprising:

forming a colloidal dispersion of titanium sub-oxide particles in an aqueous solution with a pH of about 2 to about 3; and placing a current collector having at least one surface comprising metal in the colloidal dispersion; and electrophoretically forming a coating of titanium sub-oxide particles on the current collector; and assembling the current collector into a battery.

7. The method of claim 6 wherein the current collector is a grid.

8. The method of claim 6 wherein the metal in the current collector is selected from the group consisting of lead, lead oxide, lead alloy, aluminum, molybdenum, nickel, titanium, tungsten, and zirconium.

9. The method of claim 8 wherein the current collector is grid and is selected from the group consisting of lead grids and lead alloy grids.

10. The method of claim 6 wherein the coating of titanium sub-oxide particles is electrophoretically formed on the substrate by providing a positive electrode in the colloidal dispersion and applying an electric field for an amount of time sufficient to form a coating of titanium oxide particles over substantially all of the current collector surface.

11. The method of claim 10 wherein the average particle size of the titanium suboxide particles is less than about 4 μm.

12. The method of claim 6 further comprising forming a coating of lead over the titanium sub-oxide coated collector before the current collector is assembled into a battery.

13. The method of claim 12 wherein the lead coating is electroplated on the titanium sub-oxide coated collector.

* * * * *